(12) United States Patent
Acher et al.

(10) Patent No.: US 9,709,441 B2
(45) Date of Patent: Jul. 18, 2017

(54) SPECTROMETER OF HIGH DIFFRACTION EFFICIENCY FOR ANALYZING THE SPECTRUM OF A LIGHT BEAM

(71) Applicant: HORIBA JOBIN YVON SAS, Longjumeau (FR)

(72) Inventors: Olivier Acher, Gif sur Yvette (FR); Simon Richard, Villebon sur Yvette (FR)

(73) Assignee: HORIBA JOBIN YVON SAS, Longjumeau (FR)

( * ) Notice: Subject to any disclaimer, the term of this patent is extended or adjusted under 35 U.S.C. 154(b) by 0 days.

(21) Appl. No.: 14/649,065

(22) PCT Filed: Nov. 29, 2013

(86) PCT No.: PCT/FR2013/052902
§ 371 (c)(1),
(2) Date: Jun. 2, 2015

(87) PCT Pub. No.: WO2014/087083
PCT Pub. Date: Jun. 12, 2014

(65) Prior Publication Data
US 2015/0300876 A1    Oct. 22, 2015

(30) Foreign Application Priority Data

Dec. 4, 2012 (FR) .................................. 12 61627

(51) Int. Cl.
*G01J 3/447* (2006.01)
*G01J 3/02* (2006.01)
(52) U.S. Cl.
CPC ........... *G01J 3/0224* (2013.01); *G01J 3/0208* (2013.01); *G01J 3/447* (2013.01)

(58) Field of Classification Search
CPC .. G01J 3/0208; G01J 3/447; G01J 4/02; G01J 2003/451
See application file for complete search history.

(56) References Cited

U.S. PATENT DOCUMENTS 7,349,089 B1 * 3/2008 Efimov ............... G01J 3/02
356/368
7,864,333 B1 * 1/2011 Olczak ............ G02B 27/286
356/491

(Continued)

FOREIGN PATENT DOCUMENTS

WO    2010/042089 A1    4/2010

OTHER PUBLICATIONS

Elena Nicolescu et al.: "Compact spectrophotometer using polarization-independent liquid crystal tunable optical filter", Proceedings of SPIE, SPIE—International Society for Optical Engineering, US , vol. 6661 Jan. 1, 2007 (Jan. 1, 2007), p. 666105, XP007921936, ISSN: 0277-786X, DOI: 10.1117/12.735152 Retrieved from the Internet: URL:http://www.ece.ncsu.edu/oleg/files-wik i/5/56/SPIE07Nicolescu-LCPG_spectrometer.pdf abstract; figures 3, 5 paragraphs [0003] , [0004].

(Continued)

*Primary Examiner* — Kara E Geisel
*Assistant Examiner* — Maurice Smith
(74) *Attorney, Agent, or Firm* — Young & Thompson

(57) ABSTRACT

A spectrometer (100) for analyzing the spectrum of an upstream light beam (1) includes an entrance slit (101) and angular dispersing elements (130). The angular dispersing elements include at least one polarization-dependent diffraction grating that is suitable for, at the plurality of wavelengths (1, 2, 3), diffracting a corrected light beam (20) into diffracted light beams (31, 32, 33) in a given particular diffraction order of the polarization-dependent diffraction grating, which is either the +1 diffraction order or the −1

(Continued)

diffraction order, when the corrected light beam has a preset corrected polarization state that is circular; and the spectrometer includes elements for modifying polarization (1100) placed between the entrance slit and the angular dispersion elements, which are suitable for modifying the polarization state of the upstream light beam in order to generate the corrected light beam with a preset corrected polarization state.

15 Claims, 6 Drawing Sheets

(56) References Cited

U.S. PATENT DOCUMENTS

| | | | |
|---|---|---|---|
| 2009/0009668 A1* | 1/2009 | Tan | G02B 5/3016 |
| | | | 349/1 |
| 2010/0225856 A1 | 9/2010 | Escuti et al. | |
| 2010/0225876 A1 | 9/2010 | Escuti et al. | |
| 2013/0027713 A1* | 1/2013 | Kudenov | G01N 21/21 |
| | | | 356/491 |
| 2015/0204724 A1* | 7/2015 | Acher | G01J 4/04 |
| | | | 356/364 |

OTHER PUBLICATIONS

International Search Report, dated Feb. 25, 2014, from corresponding PCT application.

\* cited by examiner

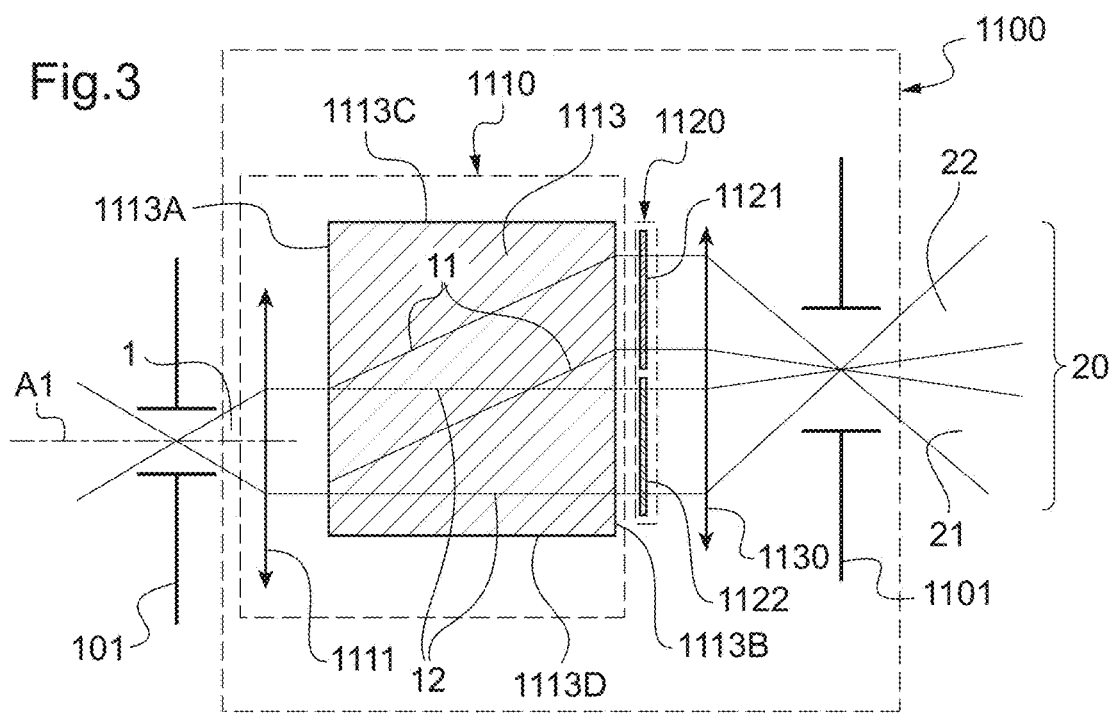
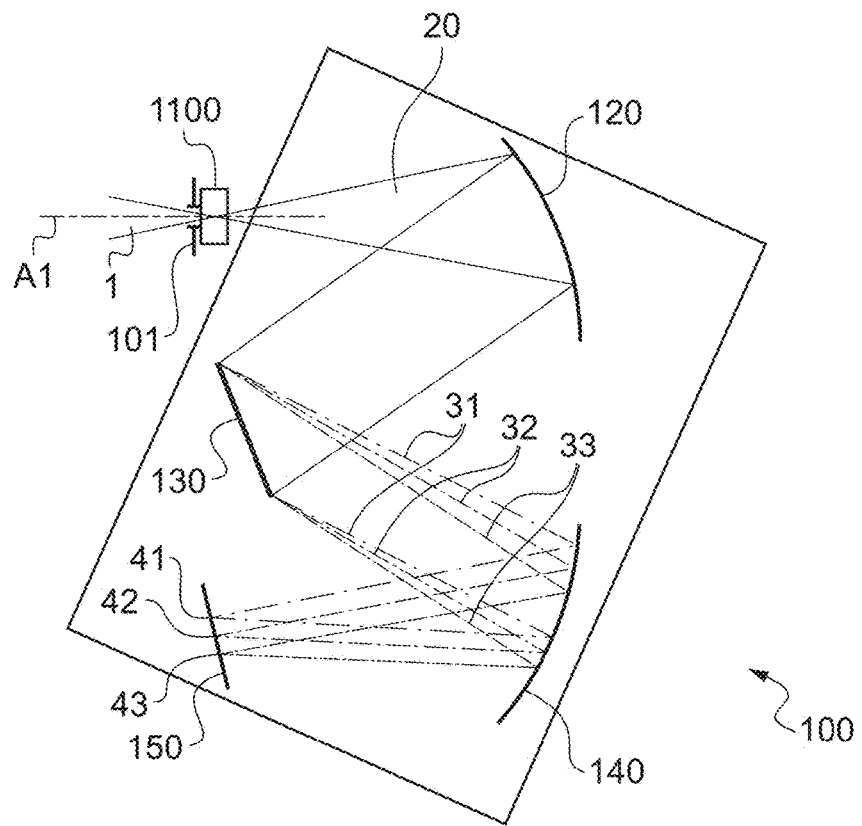

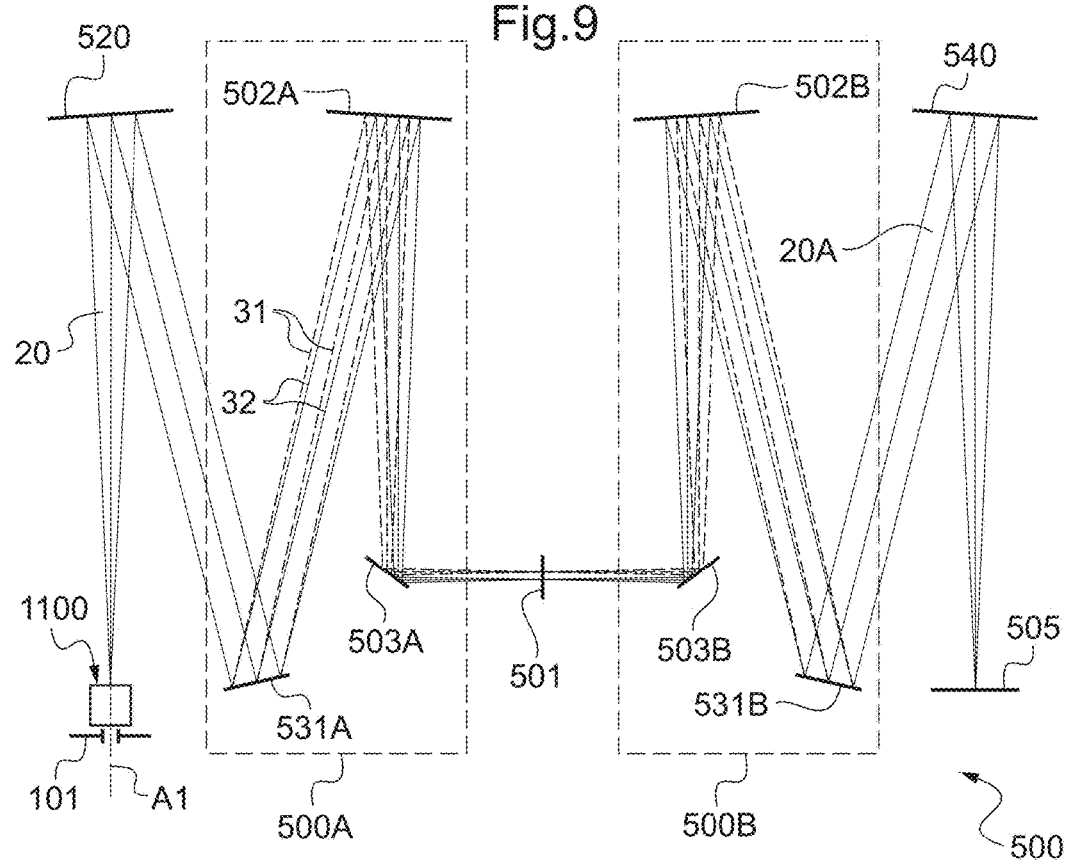
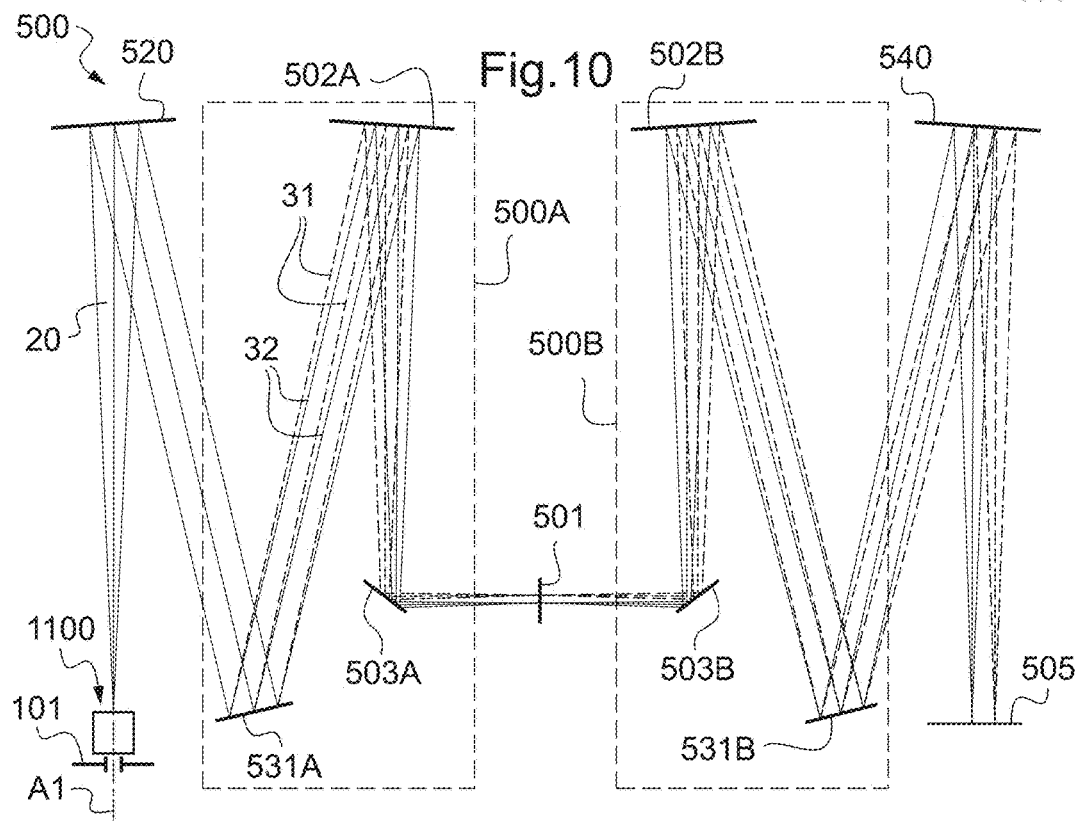

SPECTROMETER OF HIGH DIFFRACTION EFFICIENCY FOR ANALYZING THE SPECTRUM OF A LIGHT BEAM

The invention relates to the field of optical metrology.

More particularly, it relates to a spectrometer of high diffraction efficiency for analysing the spectrum of a light beam or a light source, whatever the polarization state of the light beam is.

The present invention finds a particularly advantageous application when a high efficiency of the spectrometer over a broad spectrum band is desired.

In optical metrology, spectroscopy is a technique that consists in analysing the spectrum of an upstream light beam, whether the latter comes directly from a light source or from an object illuminated by a light source, to deduce therefrom certain properties of this source or this object.

A spectrometer is an optical instrument allowing to perform such an analysis for a spectrum comprising a plurality of wavelengths.

It is well known by the one skilled in the art that a spectrometer generally includes:
- an entrance slit adapted to let the upstream light beam through,
- angular dispersion means adapted to angularly disperse an incident light beam according to a plurality of wavelengths.

In many applications, as for example Raman spectroscopy or near-infrared spectroscopy, the quantity of light effectively available at the exit of the spectrometer, at detection means or at an exit slit, for the spectrum analysis is low. A fast and accurate measurement may then prove difficult.

Hence, a spectrometer, whose angular dispersion means would have a very high efficiency over a broad spectrum band, would allow to carry with a minimum of losses all the photons of the upstream light beam from the entrance slit to the detection means or to the exit slit. This would offer a greater rapidity and a better accuracy of measurement of the spectrometer for the analysis of the upstream light beam spectrum.

From documents US2010/0225856A1 and US2010/0225876A1 are known, for example, angular dispersion means comprising at least one polarization-separation diffraction grating having a very high diffraction efficiency in the diffraction orders +1 and −1 over a broad spectrum band, in particular in the domain of ultraviolet, visible and infrared wavelengths.

The documents US2010/0225856A1 and US2010/0225876A1 teach that such a polarization-separation diffraction grating diffracts an incident light beam, which has any polarization state, into a beam diffracted in the order 0, a beam diffracted in the order +1, and/or a beam diffracted in the order −1.

According to these same documents, a polarization-separation diffraction grating has the following properties:
- the sum of the diffraction efficiencies in the diffraction order +1 and in the diffraction order −1 is very high, typically higher than 90%, and
- the relative intensities of the light beams diffracted in the diffraction order +1 and in the diffraction order −1 are function of the polarization state of the incident light beam, and can vary between 0% and 100% of the total intensity of the light beams diffracted in the diffraction order +1 and in the diffraction order −1 according to the polarization state of the incident light beam.

In particular, as described in the document WO 2010/042089, when the incident light beam has a circular polarization state, the diffraction efficiency in the diffraction order +1 or in the diffraction order −1 is close to 100%.

However, a spectrometer is generally designed so that a single diffraction order, except the diffraction order 0, is exploited for the analysis of the upstream light beam.

Hence, a spectrometer using a polarization-separation diffraction grating for analysing the spectrum of an upstream light beam may have an almost-zero efficiency according to the polarization state of the upstream light beam and is hence less advantageous than a conventional spectrometer using other angular dispersion means optimized so that the exploitation of the diffraction order for the analysis of the upstream light beam is efficient.

Nevertheless, a spectrometer is known from the document "*Compact Spectrophotometer using polarization-independent liquid crystal tunable optical filters*" (E. Nicolescu et al., Imaging Spectrometry XII, Proc. of SPIE, Vol. 6661, No. 666105, 2007), which is a little sensitive to the polarization state of the upstream light beam. However, such a spectrometer, which comprises a succession of several polarization-separation diffraction gratings, is difficult to implement.

In order to remedy the above-mentioned drawback of the state of the art, the present invention proposes a spectrometer allowing to exploit the very high diffraction efficiency of a polarization-separation polarization grating over a broad spectrum band.

For that purpose, the invention relates to a spectrometer for analysing the spectrum of an upstream light beam including:
- an entrance slit adapted to let said upstream light beam through,
- angular dispersion means, which can be fixed or mobile, adapted to angularly disperse a rectified light beam according to a plurality of wavelengths into a plurality of diffracted light beams.

According to the invention, said angular dispersion means comprise at least one polarization-separation diffraction grating that is adapted, for said plurality of wavelengths, to diffract said rectified light beam into said plurality of diffracted light beams in a same particular diffraction order of said polarization-separation diffraction grating, which is either the diffraction order +1, or the diffraction order −1, when said rectified light beam has a predetermined rectified polarization state that is circular, and said spectrometer further includes polarization-modification means arranged between said entrance slit and said angular dispersion means, and adapted, for said plurality of wavelengths, to modify the polarization state of said upstream light beam to generate said light beam rectified according to the predetermined rectified polarization state, said polarization-modification means comprising:
- polarization-separation means adapted, for said plurality of wavelengths, to generate, from said upstream light beam, a first separated light beam and a second separated light beam that have polarization states that are orthogonal to each other, and
- polarization-rectification means adapted, for said plurality of wavelengths, to generate a first rectified polarized light beam from said first separated light beam and a second rectified polarized light beam from said second separated light beam, said first rectified polarized light beam and said second rectified polarized light beam having a same polarization state, said first rectified polarized light beam and said second rectified polarized light beam forming said rectified light beam having said same polarization state.

The spectrometer according to the invention hence uses in combination a polarization-separation diffraction grating with means for modifying the polarization of the upstream light beam.

The diffraction grating may be designed to diffract, with a very high efficiency over a very broad spectrum band, said rectified light beam into a diffracted light beam, either in the diffraction order +1 or in the diffraction order −1, if the rectified light beam has a well-determined circular rectified polarization state.

The polarization-modification means then allow, whatever the polarization state of the upstream light beam is, to prepare the polarization state of the rectified light beam according to this well-determined circular rectified polarization state, thanks to the polarization-separation means and to the polarization-rectification means.

Indeed, whatever the polarization state of the upstream light beam is, the latter is separated by the polarization-separation means into two separated light beams of orthogonal polarization that are each processed by the polarization-rectification means so that the two rectified polarized light beams have the same circular polarization state as the rectified light beam.

Hence, the spectrometer according to the invention allows to exploit the very high efficiency of the polarization-separation diffraction grating in a determined diffraction order, either the order +1 or the order −1, and whatever the polarization state of the upstream light beam is.

Advantageously, the invention allows to exploit the very high efficiency of the polarization-separation diffraction grating over a broad spectrum band.

Moreover, other advantageous and non-limitative characteristics of the spectrometer according to the invention are the following:

said spectrometer includes detection means adapted to measure the light intensity of said plurality of diffracted light beams for each wavelength of the plurality of wavelengths, and to deliver a signal representative of the spectrum of said upstream light beam;

said spectrometer includes means for focussing said plurality of diffracted light beams angularly diffracted as a function of said plurality of wavelengths, said focussing means being adapted to focus, for each wavelength of said plurality of wavelengths, said plurality of diffracted light beams on an image plane or on said detection means;

said polarization-rectification means comprise:
  a first optical polarization-rectifier component adapted, for said plurality of wavelengths, to generate said first rectified polarized light beam from said first separated light beam at said plurality of wavelengths, and
  a second optical polarization-rectifier component adapted, for said plurality of wavelengths, to generate said second rectified polarized light beam from said second separated light beam at said plurality of wavelengths;

said polarization-separation means comprise a first optical system adapted to intercept at the entrance said upstream light beam to direct it at the exit towards at least one optical polarization-separator component that is adapted, for said plurality of wavelengths, to generate, from said upstream light beam, said first separated light beam and said second separated light beam;

said first optical system is arranged so that the light rays of said upstream light beam are all parallel to each other at the exit of said first optical system, and said polarization-separation means also comprise a second optical system adapted, for said plurality of wavelengths, to intercept at the entrance, on the one hand, said first separated light beam to focus it on said first optical polarization-rectifier component, and on the other hand, said second separated polarized light beam to focus it on said second optical polarization-rectifier component;

said optical polarization-separator component comprises a Wollaston prism, a Rochon prism, a Sénarmont prism, or a beam-displacer prism, configured so that said first separated light beam and said second separated light beam have orthogonal linear polarization states, and said first optical polarization-rectifier component comprises a first quarter-wave retardation plate having a first slow axis and said second optical polarization-rectifier component comprises a second quarter-wave retardation plate having a second slow axis perpendicular to said first slow axis;

said optical polarization-separator component comprises another polarization-separation diffraction grating adapted, for said plurality of wavelengths, to diffract said upstream light beam into:
  said first separated light beam that is diffracted in a first diffraction order, which is either the diffraction order +1 or the diffraction order −1, of said other polarization-separation diffraction grating, and that has a first circular polarization state, and into
  said second separated light beam that is diffracted in a second diffraction order, which is either the diffraction order +1 or the diffraction order −1, of said other polarization-separation diffraction grating, said second diffraction order being different from the first diffraction order, and that has a second circular polarization state orthogonal to said first polarization state, and said first optical polarization-rectifier component comprises a half-wave retardation plate that reverses the polarization state of said first separated light beam passing through said first optical polarization-rectifier component, and said second optical polarization-rectifier component comprises a parallel-face neutral plate that do not modifies the polarization state of said second separated light beam passing through said second optical polarization-rectifier component;

said spectrometer includes a plurality of dispersive stages cascaded in additive or subtractive configuration;

advantageously, for example in Czerny Turner configuration, said polarization-separation diffraction grating is mounted mobile in rotation to adjust either the central wavelength of a multi-channel detector, or the wavelength at the exit of the slit of a single-channel detector;

said angular dispersion means comprise a prism having an entrance face that intercepts said rectified light beam and an exit face on which is arranged said polarization-separation diffraction grating;

said detection means comprise a multi-channel detector;

said detection means comprise a slit and a single-channel detector.

Several embodiments of the invention are described in detail with reference to the drawings, in which:

FIG. 3 is a schematic view of polarization-modification means according to another variant of the device of FIG. 1;

FIG. 4 is a schematic view of a spectrometer according to a first embodiment in a configuration of the Czerny-Turner type;

FIG. 9 is a schematic view of a double monochromator including two dispersive stages in subtractive configuration;

FIG. 10 is a schematic view of a double monochromator including two dispersive stages in additive configuration;

Figure 1:
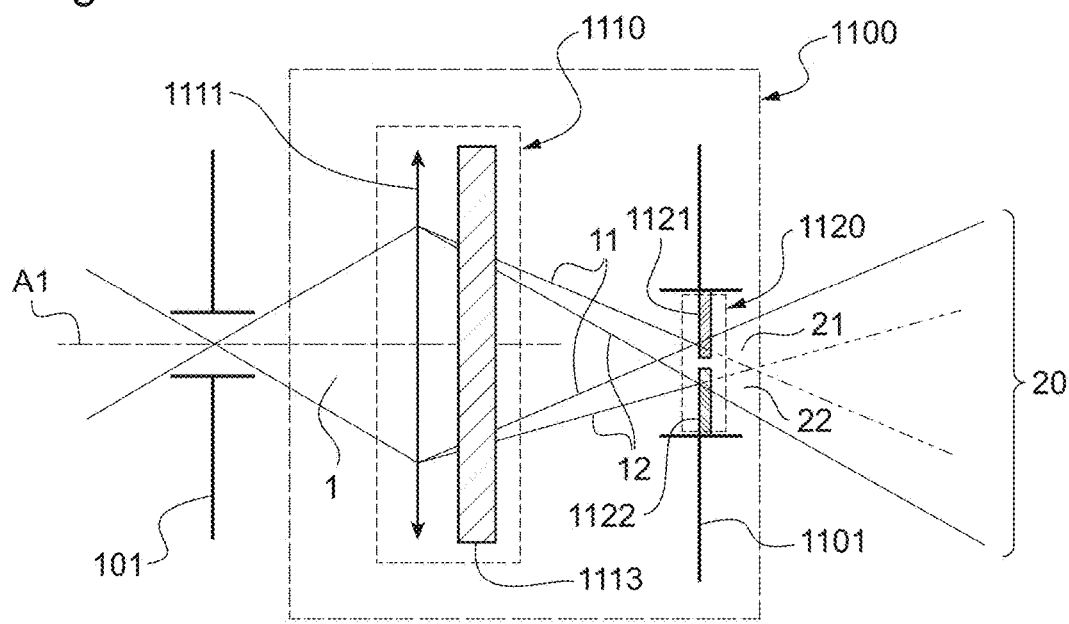
FIG. 1 is a schematic view of polarization-modification means.

In FIGS. 4 to 12 are shown different embodiments of a spectrometer 100; 200; 300; 500; 600 according to the invention that are intended either to analyse the spectrum of an upstream light beam 1 (case of the embodiments shown in FIGS. 4 to 8), or to select a portion of the spectrum of an upstream light beam 1 (case of the embodiments shown in FIGS. 9 to 12). In this second case, it is commonly talked about "monochromators".

With no limitation, it will be considered in FIGS. 1 to 12 that the upstream light beam 1 is not polarized, i.e. has any polarization state. Indeed, with no knowledge a priori of the polarization state of the upstream light beam 1, this case is the less restrictive. Moreover, the interest of the invention towards this ignorance a priori of the polarization state of the upstream light beam 1 will be understood from the examples.

Generally, and as well shown in FIGS. 4 to 12, the different embodiments of a spectrometer 100; 200; 300; 500; 600 according to the invention firstly comprises an entrance slit 101.

The entrance slit 101 is herein a planar slit of rectangular shape, centred on an optical axis A1 that is perpendicular to the plane of the entrance slit 101.

It will be considered in the different embodiments that the upstream light beam 1 is a divergent light beam formed of a cone of light rays, the cone being a cone of revolution about the optical axis A1 and having for apex the centre of the entrance slit 101.

So arranged, the entrance slit 101 lets the upstream light beam 1 through.

According to the invention, the different embodiments of a spectrometer 100; 200; 300; 500; 600 shown in FIGS. 4 to 12 include polarization-modification means 1100 that will be described in detail hereinafter as regards the examples shown in FIGS. 1 to 3.

The polarization-modification means 1100 accept at the entrance the upstream light beam 1 that has passed through the entrance slit 101 and generate at the exit a rectified light beam 20 that is also a divergent light beam.

These polarization-modification means 1100 are arranged between the entrance slit 101, downstream of the latter, and different optical elements of the spectrometer 100; 200; 300; 500; 600, these elements comprising in particular angular dispersion means, which are fixed or able to be animated by a rotational motion.

In the particular embodiments of the spectrometer 100; 500; 600 shown in FIGS. 4, 5 and 9 to 12, the angular dispersion means comprise in particular at least one polarization-separation diffraction grating 130, 231; 531A that is planar and that operates in reflection.

Figure 6:
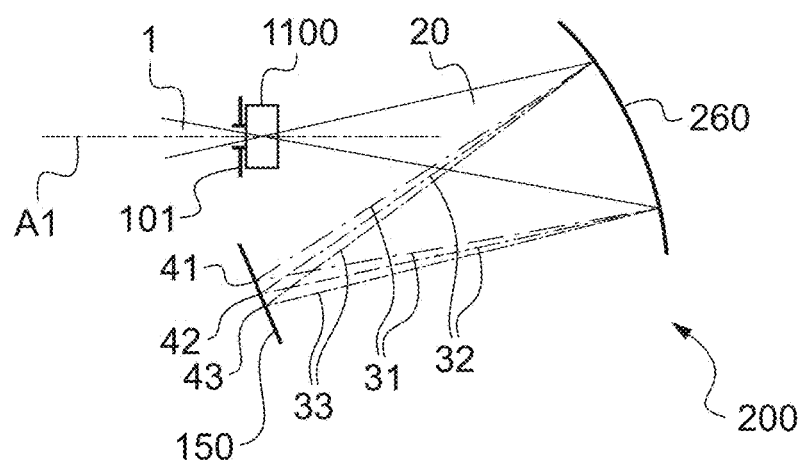
FIG. 6 is a schematic view of a spectrometer according to a second embodiment.

In another particular embodiment of the spectrometer 200 shown in FIG. 6, the angular dispersion means comprise a polarization-separation diffraction grating 260 that is concave in shape and that operates in reflection.

Figure 7:
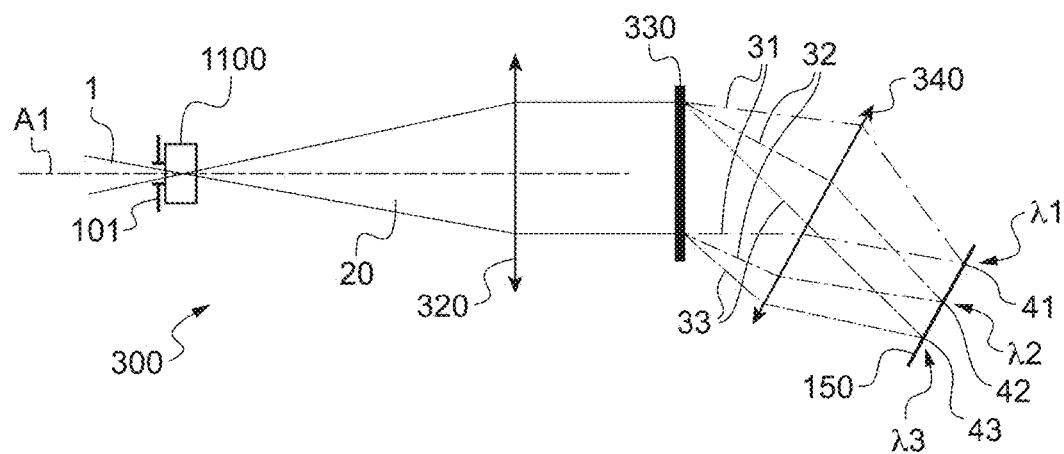
FIG. 7 is a schematic view of a spectrometer according to a third embodiment with a polarization-separation diffraction grating operating in transmission.
Figure 8:
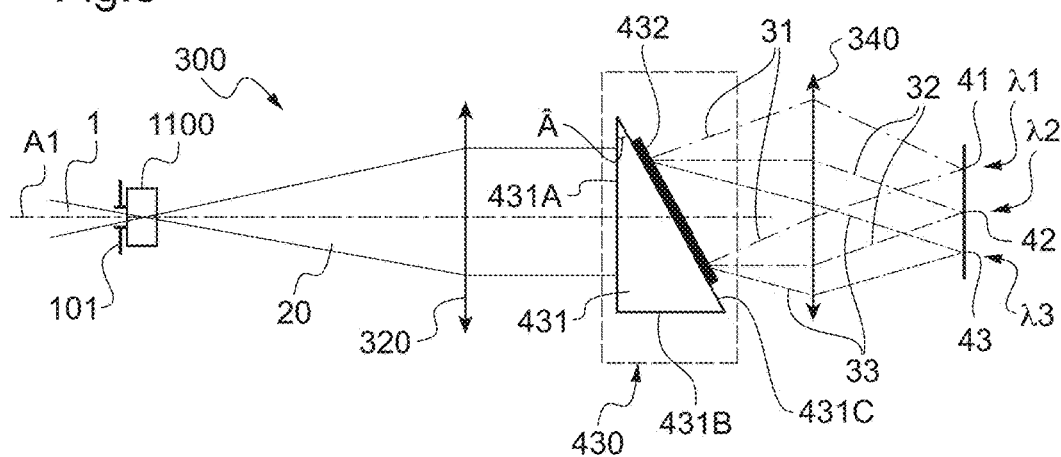
FIG. 8 is a schematic view of a spectrometer according to a variant of the third embodiment with a polarization-separation diffraction grating placed on the inclined face of a prism.

In a last particular embodiment of the spectrometer 300 shown in FIGS. 7 and 8, the angular dispersion means comprise at least one polarization-separation diffraction grating 330, 432 that is planar and that operates in transmission.

The angular dispersion means intercept the polarization-rectified light beam 20.

The angular dispersion means then angularly disperse the rectified light beam 20 as a function of the wavelength.

For the sake of simplification or for illustrating the examples of the invention, it will be considered in the following of the description, one, two or three particular wavelengths of the spectrum of the upstream light beam 1 for which the light intensity is non-zero.

These three particular wavelengths are denoted $\lambda 1$, $\lambda 2$ and $\lambda 3$.

This consideration in not in any way limitative and does not presume of the precise nature of the spectrum of the upstream light beam 1, which may for example by a continuous spectrum, a discrete spectrum, a band spectrum, a line spectrum, or a mixture of all these types of spectrum, or of the spectral extent thereof.

It is understood thereby that the angular dispersion means generate, from the light beam 20 rectified at the wavelengths $\lambda 1$, $\lambda 2$ and $\lambda 3$:

a light beam 31 diffracted at the wavelength $\lambda 1$, and a light beam 32 diffracted at the wavelength $\lambda 2$, which is angularly separated from the light beam 31 diffracted at the wavelength $\lambda 1$, a light beam 33 diffracted at the wavelength $\lambda 3$, which is angularly separated from the light beam 31 diffracted at the wavelength $\lambda 1$ and from the light beam 32 diffracted at the wavelength $\lambda 2$.

In certain particular embodiments of the invention shown in FIGS. 4, 5, and 7 to 12, the spectrometer 100; 300; 500; 600 further includes collimation means 120; 320; 520 that transform the rectified light beam 20 into a parallel light beam so that all the light rays of the rectified light beam 20 are parallel downstream of the collimation means 120; 320 and incident on the planar polarization-separation diffraction grating 130, 231; 330, 432; 531A with the same incidence.

In the different embodiments of the invention shown in FIGS. 4 to 12, the spectrometer 100; 200; 300; 500; 600 includes focussing means 140; 260; 340; 540.

The focussing means 140; 260; 340; 540, which are placed on the optical paths of the diffracted light beam 31, 32, 33, focus, for each wavelength $\lambda 1$, $\lambda 2$, $\lambda 3$, respectively, the diffracted light beams 31, 32, 33 in an image plane.

Figure 11:
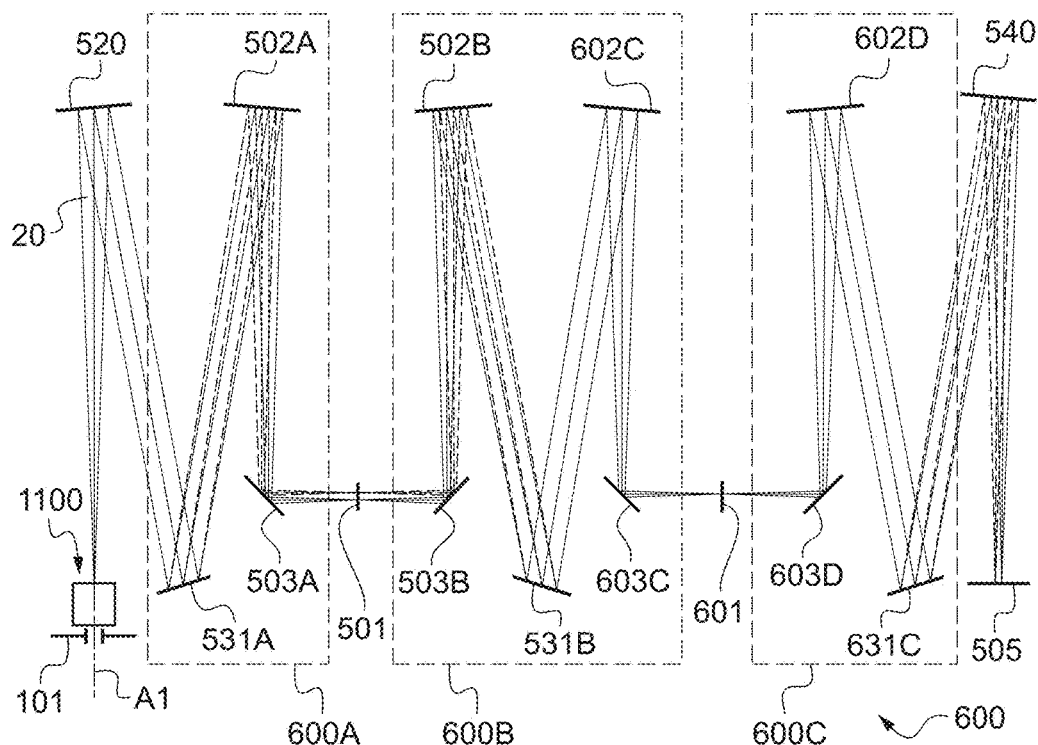
FIG. 11 is a schematic view of a triple monochromator including three dispersive stages in subtractive configuration.
Figure 12:
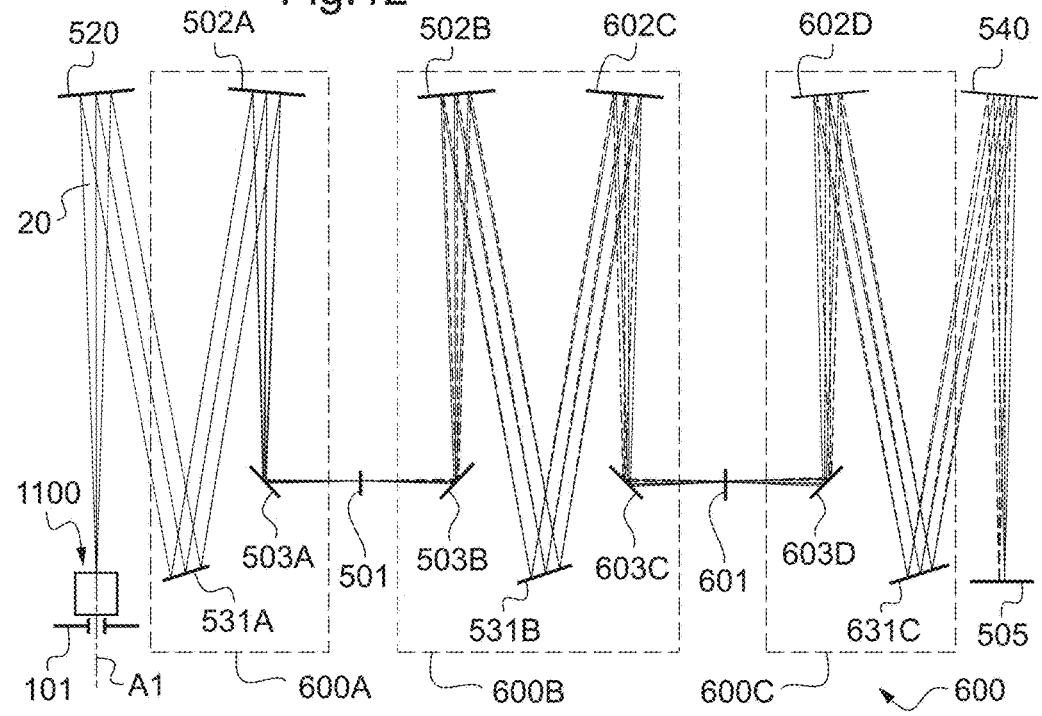
FIG. 12 is a schematic view of a triple monochromator including three dispersive stages in additive configuration.

In the particular embodiments of the invention, shown in FIGS. 9 to 12, the diffracted light beams 31, 32 are focussed on an image plane 505, 605 either at the same focussing point of the image plane 505 (case of FIG. 9), or in separated focussing points of the image plane 505; 605 (case of FIGS. 10 to 12).

In the particular embodiments of the invention shown in FIGS. 4 to 8, the image plane is intended to receive detection means 150.

As well shown in FIGS. 4 to 8, the three diffracted light beams 31, 32, 33 are then focussed on the image plane to three focussing points 41, 42, 43 spatially separated from each other as a function of the wavelengths λ1, λ2, λ3.

The detection means 150 are sensitive to the light intensities of the diffracted light beams 31, 32, 33 focussed to the focussing points 41, 42, 43 and then measure the light intensities of the diffracted light beams 31, 32, 33 for each wavelength λ1, λ2, λ3.

The detection means 150 hence deliver a signal representative of the spectrum of said upstream light beam 1, which may then be analysed.

The different above-mentioned elements of the spectrometer 100; 300 are included in a casing (not shown) that is opaque to the external light, the entrance slit 101 being located on one of the walls of this casing.

The polarization-modification means 1100, with reference to FIGS. 1 to 3, on which examples of the polarization-modification means are shown, will now be described.

Figure 2:
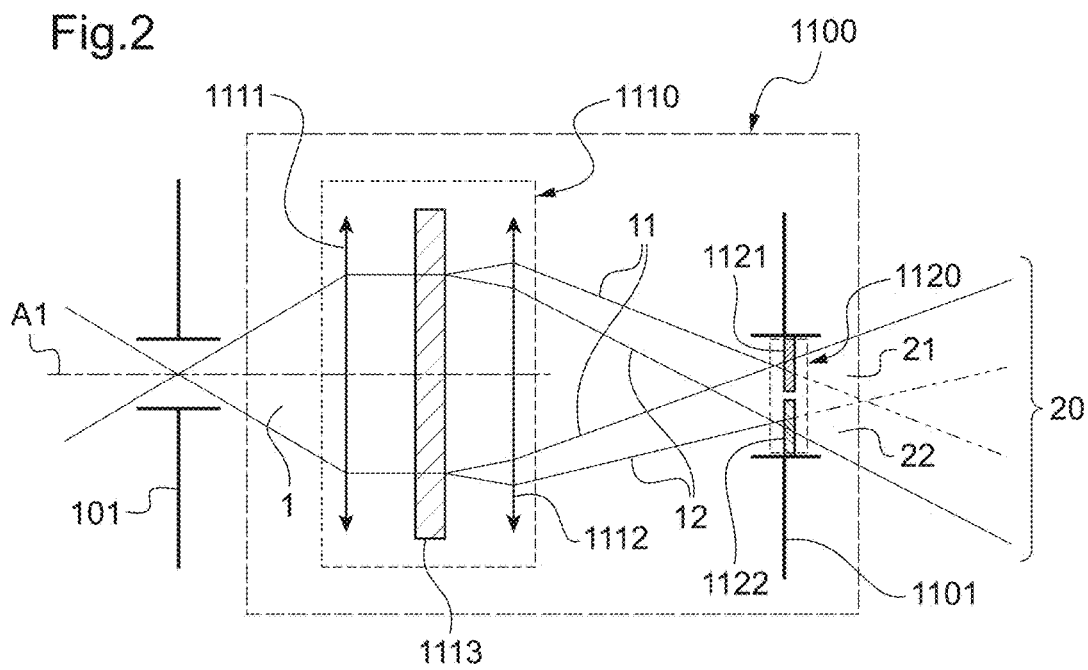
FIG. 2 is a schematic view of polarization-modification means according to a variant of the device of FIG. 1.

The polarization-modification means 1100 modify, for the plurality of wavelengths λ1, λ2, λ3, the polarization state of the upstream light beam 1 and generate the rectified light beam 20 that, as will be seen with FIGS. 1 and 2, has a rectified polarization state that is circular.

For that purpose, the polarization-modification means 1100 firstly comprise polarization-separation means 1110.

As well shown in FIGS. 1 to 3, these polarization-separation means 1110 are placed downstream of the entrance slit 101 of the spectrometer 100; 200; 300; 500; 600, along the optical path of the upstream light beam 1, to intercept the latter.

The polarization-separation means 1100 generate, for each wavelength λ1, λ2, λ3, from the upstream light beam 1, a first separated light beam 11 and a second separated light beam 12 that have polarization states that are orthogonal to each other.

The polarization-modification means 1100 moreover comprise polarization-rectification means 1120 placed downstream of the polarization-separation means 1110 along optical paths of the first separated light beam 11 and of the second separated light beam 12 that are focussed to the polarization-rectification means 1120 by the polarization-separation means 1110.

The polarization-rectification means 1120 then generate at the exit, for each wavelength λ1, λ2, λ3:
a first rectified polarized light beam 21 from the first separated light beam 11, and
a second rectified polarized light beam 22 from the second separated light beam 12.

According to the invention, the first rectified polarized light beam 21 and the second rectified polarized light beam 22 have a same polarization state that is a circular polarization state and form by superimposition a rectified light beam 20 at the exit of the polarization-rectification means 1120.

Hence, the rectified polarization state of the rectified light beam 20 is identical to the circular polarization state of the first rectified polarized light beam 21 and of the second rectified polarized light beam 22.

It will be described hereinafter (see examples of FIGS. 1 to 3) how the polarization-separation means 1110 generate the first separated light beam 11 and the second separated light beam 12 and how the polarization-rectification means 1120 generate the rectified light beam 20 whose rectified polarization state is circular.

Preferably in these three examples, the polarization-rectification means 1120 comprise a first optical polarization-rectifier component 1121 and a second optical polarization-rectifier component 1122.

The first optical polarization-rectifier component 1121 and the second optical polarization-rectifier component 1122 are herein planar components, located side by side.

In the two first examples of FIGS. 1 and 2, the polarization-rectification means 1120 are located in the plane of an exit slit 1101 that is centred on the optical axis A1.

This exit slit 1101 is either real, i.e. materialized by means of a physical aperture in a cap of the polarization-modification means 1100; or virtual, i.e. it corresponds to the image of the entrance slit 101 through polarization-separation means 1110.

In the third example, the polarization-rectification means 1120 are located just after the polarization-separation means 1110 (see the details hereinafter).

The first optical polarization-rectifier component 1121 is arranged to receive said first separated light beam 11 and generates, for each wavelength λ1, λ2, λ3, the first rectified polarized light beam 21; respectively, the second optical polarization-rectifier component 1122 is arranged to receive said second separated light beam 12 and generates, for each wavelength λ1, λ2, λ3, the second rectified polarized light beam 22.

According to the first example illustrated in FIG. 1, the polarization-separation means 1110 comprise a first optical system 1111 herein comprising a convergent lens refracting the divergent upstream light beam 1.

At the exit of the convergent lens 1111, the upstream light beam 1 is directed towards an optical polarization-separator component 1113.

In this first example, this optical polarization-separator component 1113 comprises a Wollaston prism.

It is well known that a Wollaston prism is in fact a parallelepiped formed of two prisms, this parallelepiped having the particularity to separate an incident light ray of any polarization into tow light rays that are angularly separated and the have linear polarization states that are orthogonal to each other.

Hence, the Wollaston prism 1113 generates from the upstream light beam 1, at each wavelength λ1, λ2, λ3:
the first separated light beam 11 according to a linear polarization state, and
the second separated light beam 12 according to a linear polarization state orthogonal to the polarization state of the first separated light beam 11.

As a variant, the optical polarization-separator component could for example comprise a Rochon prism, a Sénarmont prism.

As another variant, in this first example, the optical polarization-separator component could for example comprise a polarization-separation diffraction grating.

In the configuration of the first example of FIG. 1 where the optical polarization-separator component 1113 comprises a Wollaston prism, the first optical polarization-rectifier component 1121 comprises a first quarter-wave retardation plate and the second optical polarization-rectifier component 1122 comprises a second quarter-wave retardation plate.

The retardation plates 1121, 1122 are single-axis plates made in a birefringent crystal.

Conventionally, the first retardation plate 1121 has hence a first slow axis and the second retardation plate 1122 has a second slow axis.

It is well known in optics that a quarter-wave retardation plate transforms a linear polarization forming an angle of 45° with the slow axis of the retardation plate into a circular polarization, the direction of the circular polarization being obtained by bringing the linear polarization on the slow axis of the quarter-wave plate.

The first retardation plate 1121 is arranged with respect to the Wollaston prism 1113 so that the first slow axis of the first retardation plate 1121 forms an angle of 45° with the axis of linear polarization of the first separated light beam 11.

The second retardation plate 1122 is oriented with respect to the first retardation plate 1121 so that the second slow axis is orthogonal to the first slow axis.

Hence oriented, the second retardation plate 1122 is arranged with respect to the Wollaston prism 1113 so that the second slow axis of the second retardation plate 1122 also forms a same angle of 45° with the axis of linear polarization of the second separated light beam 12, the axis of linear polarization of the second separated light beam 12 being orthogonal to the axis of linear polarization of the first separated light beam 11.

It is hence understood that:
the first rectified polarized light beam 21, which is generated by transmission of the first separated light beam 11 having a linear polarization state through the first quarter-wave retardation plate 1121, has at the exit of said retardation plate a circular polarization state, and
the second rectified polarized light beam 22, which is generated by transmission of the second separated light beam 12 having a linear polarization state through the second quarter-wave retardation plate 1122, has at the exit of said retardation plate a circular polarization state.

Moreover, as the first separated light beam 11 has a linear polarization state orthogonal to the polarization state of the second separated light beam 12, and as the first slow axis is orthogonal to the second slow axis, the circular polarization states of the first rectified polarized light beam 21 and the second rectified polarized light beam 22 are identical to each other.

Hence, as explained hereinabove, the rectified light beam 20, which is formed of the first rectified polarized light beam 21 and of the second rectified polarized light beam 22, has a circular polarization state.

According to a second example illustrated in FIG. 2, the polarization-separation means 1110 also comprise a first optical system 1111 herein comprising a convergent lens refracting the divergent upstream light beam 1.

This convergent lens 1111 whose optical axis is merged with the optical axis A1 is arranged along this optical axis A1 with respect to the entrance slit 101 so that the upstream light beam 1 is collimated, i.e. the light rays of the upstream light beam 1 are all parallel to each other at the exit of the convergent lens 1111.

At the exit of the convergent lens 1111, the upstream light beam 1 is then directed towards an optical polarization-separator component 1113 so that the upstream light beam 1 is herein in normal incidence on this optical polarization-separator component 1113.

In this second example, the optical polarization-separator component 1113 herein comprises another polarization-separation diffraction grating.

As a variant, in this second example, the optical polarization-separator component could for example comprise a Wollaston prism, a Rochon prism, a Sénarmont prism.

Generally, a diffraction grating diffracts an incident light beam into one or several diffracted beams propagating in different directions, i.e. that the diffracted beams are angularly separated from each other.

With reference to the diffraction grating law, it is hence talked about diffraction orders such as the order 0 and the higher orders: orders ±1, orders ±2, etc. . . .

A polarization-separation diffraction grating is generally a planar holographic component formed of at least one liquid-crystal diffractive wave plate.

A polarization-separation diffraction grating has the particularity to diffract an incident light beam into at least one diffracted beam in the diffraction order +1 and a diffracted beam in the diffraction order −1, the two diffracted beams being circularly and orthogonally polarized. For example, if the beam diffracted in the diffraction order +1 is circularly polarized to the left, then the beam diffracted in the diffraction order −1 is circularly polarized to the right, and vice versa.

This particularity exists whether the incident light beam is not-polarized or polarized in any way. Indeed, the polarization state of the incident light ray governs only the distribution of the light energy in the diffraction order +1 and in the diffraction order +1.

The other polarization-separation diffraction grating 1113 is designed to operate over a spectrum band covering at least the spectrum of the upstream light beam 1, so that it has diffraction efficiencies in the diffraction order +1 and in the diffraction order −1 such that their sum is the closer possible to 100%, typically higher than or equal to 90%, or preferably higher than or equal to 95%.

That way, the diffraction of the upstream light beam 1 by the other polarization-separation diffraction grating 1113 is made with a very high efficiency, whatever the polarization state of the upstream light beam 1 is.

The sum of the diffraction efficiencies in the diffraction order +1 and in the diffraction order −1 cannot be equal to 100%. Indeed, not only a portion of the light incident on the polarization-separation diffraction grating is not diffracted—it is either back-reflected, or absorbed, or scattered—, but also a portion of the light incident on a polarization-separation diffraction grating is diffracted in the diffraction order 0.

Arranged downstream of the convergent lens 1111, the other polarization-separation diffraction grating 1113 diffracts, for each wavelength $\lambda 1$, $\lambda 2$, $\lambda 3$, the upstream light beam 1 into:
the first separated light beam 11 that is diffracted in a first diffraction order, herein the diffraction order +1 of the other polarization-separation diffraction grating 1113, and that has a first circular polarization state, herein a left circular polarization, and
the second separated light beam 12 that is diffracted in a second diffraction order, herein the diffraction order −1 of the other polarization-separation diffraction grating 1113, and that has a second circular polarization state, herein a right circular polarization, this second polarization state being orthogonal to the first polarization state.

In this second example, the polarization-separation means 1110 also comprise a second optical system 1112, herein formed by a second convergent lens having an optical axis merged with the optical axis A1.

This second convergent lens 1112 is interposed between the other polarization-separation diffraction grating 1113 and the polarization-rectification means 1120, along the optical paths of the first separated light beam 11 and of the second separated light beam 12, to intercept them.

As well shown in FIG. 2, the second convergent lens 1112 then focusses for each wavelength λ1, λ2, λ3:
- the first separated light beam 11 on the first optical polarization-rectifier component 1121, and
- the second separated light beam 12 on the second optical polarization-rectifier component 1122.

In the configuration of the second example of FIG. 2 where the optical polarization-separator component 1113 comprises another polarization-separation diffraction grating, the first optical polarization-rectifier component 1121 comprises a first half-wave retardation plate and the second optical polarization-rectifier component 1122 comprises a parallel-face neutral plate.

It is well known in optics that a half-wave retardation plate transforms, or "reverses", a circular polarization into an orthogonal circular polarization, i.e. a left circular polarization is reversed into a right circular polarization, and vice versa.

Besides, it will be understood that a parallel-face neutral plate is a transparent plate that does not modify the polarization state of a light beam passing through it.

It is hence understood that:
- the first rectified polarized light beam 21, that is generated by transmission of the first separated light beam 11 having a left circular polarization state through the half-wave plate 1121, has at the exit of said half-wave plate a right circular polarization state, and
- the second rectified polarized light beam 22, that is generated by transmission of the second separated light beam 12 having a right circular polarization state through the quarter-wave neutral plate 1122, has at the exit of said neutral plate a right circular polarization state.

Hence, as explained hereinabove, the rectified light beam 20, which is formed of the superimposition of the first rectified polarized light beam 21 and of the second rectified polarized light beam 22, has a circular polarization state, which is herein a right polarization.

According to a third example illustrated in FIG. 3, the polarization-separation means 1110 comprise, in addition to the first optical system 1111 similar to the first example, an optical polarization-separator component 1113 that includes a beam-displacer prism.

This beam-displacer prism 1113 is herein formed of a calcite birefringent crystal, of parallelepipedal and straight shape, having an entrance face 1113A, an exit face 1113B, an upper face 1113C and a lower face 1113D parallel to the upper face 1113C.

The entrance face 1113A and the exit face 1113B are parallel to each other and cut so that the optical axis of the crystal forms an angle of 45° with the entrance face 1113A in a plane parallel to the upper face 1113C and to the lower face 1113D.

The beam-displacer prism 1113 separates the upstream light beam 1, which is collimated in normal incidence on the entrance face 1113A of the beam-displacer prism 1113 by the convergent lens 1111, into the first separated light beam 11 that is deviated with respect to the upstream light beam 1 and into the second separated light beam 12 that is not deviated with respect to the upstream light beam 1.

By refraction on the exit face 1113B of the beam-displacer prism 1113, the first separated light beam 11 and the second separated light beam 12 emerge from the beam-displacer prism 1113 to form two collimated light beams that propagate parallel to each other and in the same direction as the upstream light beam 1.

By propagation in the beam-displacer prism 1113, the first separated light beam 11 and the second separated light beam 12 are displaced and are not superimposed to each other at the exit of the beam-displacer prism 1113.

The size of the beam-displacer prism 1113 along the optical axis A1 may be adjusted so that the displacement between the first separated light beam 11 and the second separated light beam 12 is sufficient to that the first separated light beam 11 and the second separated light beam 12 are not superimposed to each other at the exit of the beam-displacer prism 1113.

It will hence be provided a minimal size of the beam-displacer prism 1113 along the optical axis A1.

At the exit of the beam-displacer prism 1113, the first separated light beam 11 and the second separated light beam 12 have linear polarization states, that are orthogonal to each other.

Hence, the polarization-rectification means 1120 are identical to those of the first example illustrated in FIG. 1 and comprise two quarter-wave plates 1121, 1122 oriented in such a manner that the rectified polarized light beams 21, 22 have an identical circular polarization state.

Those rectified polarized light beams 21, 22 are then focussed on the exit slit 1101 thanks to a focussing lens 1130, to form the rectified light beam 20.

We have hence just described the way the spectrometer 100; 200; 300; 500; 600 according to the invention allows to generate, for each wavelength λ1, λ2, λ3, from the upstream light beam 1 that has a priori any polarization state, a rectified light beam 20 that has a circular polarization state.

With no limitation, it will be considered in the following of the description that the rectified light beam 20 has a circular polarization state that is a right polarization.

We will now comprise the advantage of such a preparation of the polarization state of the rectified light beam 20 from the description of the angular dispersion means 130; 230; 330; 430 of the spectrometer 100; 300 according to the invention.

Indeed, still according to the invention, the angular dispersion means 130; 230; 330; 430 comprise at least one polarization-separation diffraction grating 130, 231, 232, 233; 330; 432.

This polarization-separation diffraction grating 130, 231, 232, 233; 330; 432 may be of the same type as the other polarization-separation diffraction grating 1113 of FIG. 2.

Preferably, the polarization-separation diffraction grating 130; 231, 232, 233; 330; 432 is designed so that is has a very high diffraction efficiency, higher than 90%, better higher than 95% over the whole of the spectrum of the upstream light beam 1, in a single and same particular diffraction order, which may be either the diffraction order +1, or the diffraction order −1, when the rectified light beam 20 has a predetermined polarization state that is circular. The light beam diffracted in the particular diffraction order by the so-designed grating has then:
- a circular polarization state identical to the polarization state of the rectified light beam 20 when this grating operates in reflection, and
- a reversed circular polarization state when this grating operates in transmission.

With no limitation, it will be considered herein that the polarization-separation diffraction grating 130; 231, 232, 233; 330; 432 is designed so that the particular diffraction order corresponds to the diffraction order +1, the light beam diffracted in the diffraction order +1 being polarized according to a predetermined polarization state that is a left circular polarization.

Moreover, in the spectrometer 100; 300 according to the invention, the angular dispersion means 130; 230; 330; 430 operating in combination with the polarization-modification means 1100, these latter are hence configured in such a manner that the rectified polarization state of the rectified light beam 20 corresponds to the predetermined polarization state for which the polarization-separation diffraction grating 130; 231, 232, 233; 330; 432 is the more efficient in the particular diffraction order +1, in the example considered hereinabove.

Hence, it will be understood that the polarization-separation diffraction grating 130; 231, 232, 233; 330; 432 of the angular dispersion means 130; 230; 330; 430 diffracts with a very high efficiency, for each wavelength λ1, λ2, λ3, the rectified light beam 20 that has a left circular polarization state, into diffracted light beams at said wavelengths in the diffraction order +1.

More precisely, the polarization-separation diffraction grating 130; 231, 232, 233; 330; 432 diffracts the rectified light beam 20 into:
the light beam 31 diffracted at the wavelength λ1,
the light beam 32 diffracted at the wavelength λ2,
the light beam 33 diffracted at the wavelength λ3.

As explained hereinabove, these diffracted light beams 31, 32, 33 are then exploited by the focussing means 140; 340 and the detection means 150 so that the spectrometer 100; 300 can analyse the spectrum of the upstream light beam 1.

The different embodiments of the above-described invention, in which the polarization-modification means can be indifferently those of the first example of FIG. 1 or those of the second example of FIG. 2, will be described in more detail hereinafter.

First Embodiment of a Spectrometer

In FIG. 3 is shown a spectrometer 100 according to a first embodiment of the invention.

This spectrometer 100 is a well-known, so-called "Czerny-Turner", type of spectrometer.

As a variant, the spectrometer 100 could for example be of the "Ebert-Fastie", "Monk-Gillieson" or "Littrow" type.

In this configuration, the collimation means 120 comprise a first spherical concave mirror whose focal plane is located in the plane of the exit slit 1101 of the polarization-modification means 1100.

Hence arranged, the first concave mirror 120 collimates the rectified light beam 20 on the polarization-separation diffraction grating 130 of the spectrometer 100 that operates in reflection.

As explained hereinabove, the rectified light beam 20 having a rectified polarization state that is circular, the polarization-separation diffraction grating 130 diffracts in reflection the rectified light beam 20 in a single diffraction order, herein the diffraction order +1, for each wavelength λ1, λ2, λ3, of the upstream light beam 1, hence giving rise to three diffracted light beams 31, 32, 33 that are light beams of parallel rays.

Still in this configuration, the focussing means 140 comprise a second spherical concave mirror, which is herein identical to the first concave mirror 120, whose focal point is located in the plane of the detection means 150.

So arranged, the second concave mirror 140 focusses the diffracted light beams 31, 32, 33, to the three focussing points 41, 42, 43, respectively, on the detection means 150.

The detection means 150 includes in this first embodiment a multi-channel detector, herein formed of a linear array of CCD sensors, placed in such a manner that the focussing points 41, 42, 43, are aligned on the line of CCD sensors.

The focussing points 41, 42, 43 are centred on the different CCD sensors so that the multi-channel detector 150 delivers a signal relating to the light intensity diffracted at the different wavelengths λ1, λ2, λ3.

This is true for all the wavelengths belonging to the spectrum of the upstream light beam 1, the detection means 150 then measure, as a function of the wavelength, the light intensities of the upstream light beam 1 to deduce its spectrum therefrom.

It is moreover known that the spectral resolution (expressed in nanometers) of a spectrometer as a function of the size of the CCD sensors and the spacing thereof.

As a variant, the multi-channel detector could for example be formed of an array of photodiodes, a two-dimension matrix of CCD sensors or photodiodes.

As another variant, the detection means could include a slit and a single-channel detector. The slit has a shape and size that are those of the image of the entrance slit by the optical collimation system, the polarization-separation diffraction grating and the optical focussing system. The single-channel detector is a single detector, for example a silicon, germanium, InGaAs, InAs, InSb, PbS, PbSe or HgCdTe photodiode, an avalanche photodiode, a photomultiplier tube.

The efficiency of the polarization-separation diffraction grating 130 being very high, the light intensities of the diffracted light beams 31, 32, 33 measured at the focussing points 41, 42, 43, of the detection means are very high, and the analysis of the spectrum of the upstream light beam 1 is very easy.

Moreover, the spectrometer 100 is relatively less sensitive to the ambient spurious light.

It is finally possible to use only one polarization-separation diffraction grating 130 to cover a broad spectrum band, which may avoid to insert a multi-grating turret in the spectrometer 100.

Variant of the First Embodiment of a Spectrometer

In FIG. 4 is shown a spectrometer 100 according to a variant of the first embodiment of the invention.

In this variant, the spectrometer 100 includes angular dispersion means 230 that herein comprise three polarization-separation diffraction grating 231, 232, 233.

These three polarization-separation diffraction gratings 231, 232, 233 are designed so that their spectrum bands partially overlap. For example, the first polarization-separation diffraction grating 231 covers a spectrum band going from 350 nm to 1000 nm, the second polarization-separation diffraction grating 232 covers a spectrum band going from 900 nm to 1800 nm, and the third polarization-separation diffraction grating 233 covers a spectrum band going from 1700 nm to 2500 nm.

This allows, on the one hand, to cover a still broader spectrum band, and on the other hand, to have polarization-separation diffraction gratings 231, 232, 233 whose efficiency is further optimized over their respective spectrum band.

The three polarization-separation diffraction gratings 231, 232, 233 are indeed arranged on the three lateral faces of a multi-grating turret 230A of triangular shape. By rotation of this turret, it is then possible to select in the spectrometer 100, the polarization-separation diffraction grating 231, 232, 233 to be used as a function of the suitable spectrum band.

Figure 5:
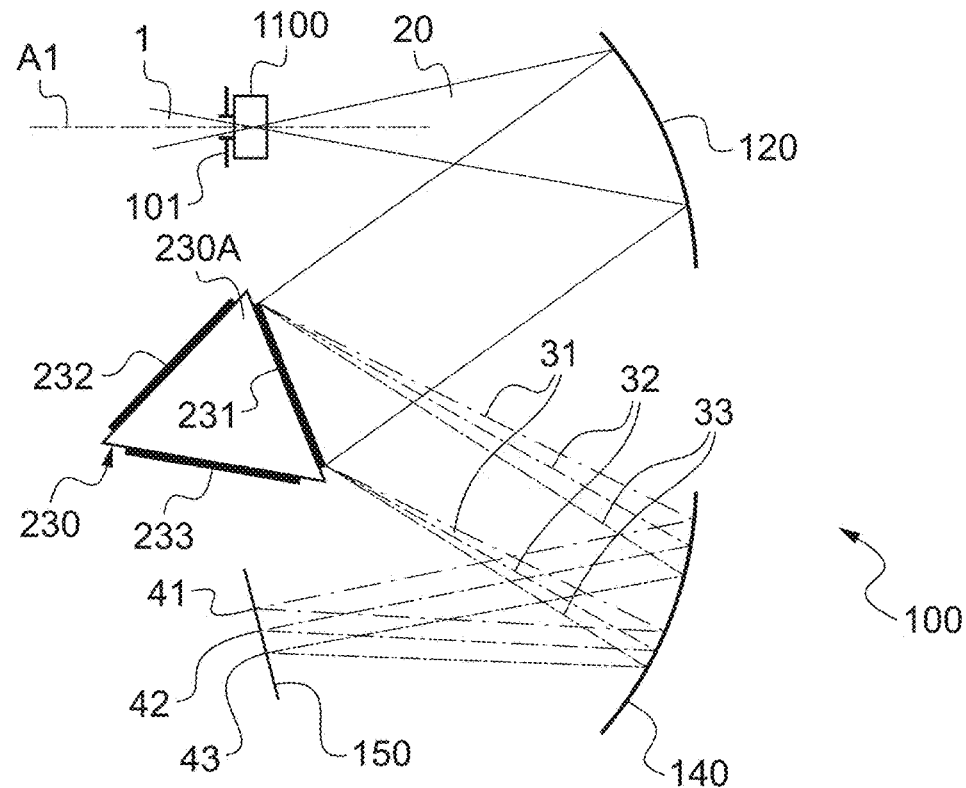
FIG. 5 is a schematic view of a spectrometer according to a variant of the first embodiment comprising a multi-grating turret.

As a variant of the first embodiment of the invention and of the variant thereof shown in FIGS. 4 and 5, respectively, where the spectrometer 100 is of the "Czerny-Turner" type, the spectrometer could for example include a plurality of dispersive stages cascaded in additive or subtractive configuration.

According to this variant, each of the dispersive stages may include an additional polarization-separation diffraction grating identical to the polarization-separation diffraction grating of the angular dispersion means.

By cascading several stages in additive configuration, it is possible to add the spectrum dispersions of the different stages without degrading the whole transmission in the spectrometer thanks to the use of polarization-separation diffraction gratings.

By cascading several stages in subtractive configuration, it is possible to obtain an extremely sharp tunable filter, while keeping an excellent transmission through the spectrometer.

Second Embodiment of a Spectrometer

In FIG. 6 is shown a spectrometer 200 according to a second embodiment of the invention.

This spectrometer 200 includes a hybrid optical component 260 gathering the angular dispersion means and the focussing means.

This hybrid optical component 260 is herein formed of a polarization-separation diffraction grating, which operates in reflection and which is not planar but has a shape that is for example spherical or concave, so that the rectified light beam 20 is simultaneously diffracted and focussed by the hybrid optical component 260 on the detection means 150.

The configuration of this second embodiment is particularly advantageous in terms of overall size and adjustment due to the reduced number of components used in this spectrometer 200.

Third Embodiment of a Spectrometer

In FIG. 7 is shown a spectrometer 300 according to a third embodiment of the invention.

The collimation means 320 of the spectrometer 300 herein comprise a first convergent lens whose focal plane is located in the plane of the exit slit 3101 of the polarization-modification means 1100 so that the first lens 320 collimates the rectified light beam 20 on the polarization-separation diffraction grating 330 of the spectrometer 300 that operates in transmission in this embodiment.

The focussing means 340 comprise a second convergent lens whose focal plane is substantially merged with the plane of the detection means 350 that are identical to the detection means 150 of the spectrometer 100 shown in FIG. 3.

So arranged, the second lens 340 focusses the diffracted light beams 31, 32, 33 to the three focussing points 41, 42, 43, respectively, on the detection means 350.

As a variant, and advantageously, the collimation means and the focussing means could for example comprise complex optical systems with several lenses allowing to correct the geometric and chromatic aberrations over a broad spectrum band and for upstream light beams having a high divergence.

It is observed in FIG. 5 that all the elements of the spectrometer 300 are not aligned along a same direction, as for example that of the optical axis A1. In certain configurations, it may nevertheless be advantageous to have an "in line" spectrometer, for example for reasons of overall size, or when the matter is to transform a imaging camera into a spectrometer.

Variant of the Third Embodiment of a Spectrometer

In FIG. 8 has hence been shown a spectrometer 300 according to a variant of the second embodiment of the invention.

The angular dispersion means 430 include a prism 431 and a polarization-separation diffraction grating 432 identical to the polarization-separation diffraction grating 330 of the spectrometer 300 shown in FIG. 5.

The prism 431 is a straight prism that has:
an entrance face 431A perpendicular to the optical axis A1 and oriented towards the first lens 320, so that the rays of the rectified light beam 20 are in normal incidence on this entrance face 431A of the prism 431,
a base 431B perpendicular to the entrance face 431A, and
an exit face 431C opposed and inclined with respect to the entrance face 431A and forming with the latter a prism angle Â.

Advantageously, the different faces 431A, 431B, 431C of the prism 431 are treated anti-reflection.

As shown in FIG. 6, the polarization-separation diffraction grating 432 is placed on the inclined exit face 431C of the prism 431, placed side by side with the latter by means of an optical glue.

As a variant, the polarization-separation diffraction grating could for example be placed on the entrance face of the prism, placed side by side with the latter by means of an optical glue.

As another variant, the polarization-separation diffraction grating could be manufactured directly on the exit face or the entrance face.

The prism angle Â is determined such that the diffracted light beam 32 for a wavelength λ2 located herein substantially at the centre of the spectrum of the upstream light beam 1 is collimated according to the optical axis A1.

That way, by placing the second lens 340 in such a manner that its optical axis is parallel to the optical axis A1, the third focussing points 41, 42, 43 are located in a plane perpendicular to this optical axis A1. The detection means 150 are then aligned and centred according to the optical axis A1.

Hence, the prism 431 introduces an angular deviation intended to compensate that introduced by the polarization-separation diffraction grating 432 so that the different elements of the spectrometer 300 are aligned along a same direction, herein along the optical axis A1.

This hence allows to have an "in line" spectrometer.

In other alternative embodiments of a spectrometer, the collimation means and/or the focussing means are designed and arranged so as to form an image of the exit slit of the polarization-modification means.

In the case of FIGS. 1 to 3, the polarization-modification means 1100 are then such that the first rectified polarized light beam 21 and the second rectified polarized light beam 22 are respectively imaged by the collimation means 120; 320 and/or the focussing means 140; 260; 340 to two distinct points of the detection means 150, which may then measure separately their respective intensities.

The first rectified polarized light beam 21 and the second rectified polarized light beam 22 each having a polarization state that is function of the polarization state of the upstream light beam 1, it is then possible, knowing the configuration of the polarization-modification means, to deduce therefrom the polarization state of the upstream light beam 1.

A spectropolarimeter is then obtained.

First Embodiment of a Monochromator

In FIG. 9 is shown a first monochromator 500 including two successive dispersive stages 500A, 500B, which are herein cascaded in a subtractive configuration.

The monochromator 500 includes an entrance slit 101 and polarization-modification means 1100 identical to those of the spectrometers 100, 200, 300 of the three above-described embodiments of an spectrometer.

It further includes collimation means 520, herein formed of a first concave mirror, which allows to collimate the rectified light beam 20 coming from the polarization-modification means 1100.

Likewise, the monochromator 500 includes focussing means 540 herein formed of a second concave mirror, identical to the first concave mirror 520, which allows to focus the light beam coming from the second dispersive stage 500B on an image plane 505.

The first dispersive stage 500A and the second dispersive stage 500B are located, along the light beam, between the first concave mirror 520 and the second concave mirror 540.

As shown in FIG. 9, the first dispersive stage 500A includes:
  a first polarization-separation diffraction grating 531A operating in reflection;
  a third concave mirror 502A, identical to the first concave mirror, and
  a first planar mirror 503A.

The first polarization-separation diffraction grating 531A is positioned in the monochromator 500 so as to intercept the light beam collimated by the first concave mirror 520.

The first polarization-separation diffraction grating 513A then diffracts this collimated light beam as a function of the wavelength into diffracted light beams 31, 32.

For the sake of clarity, in FIG. 9 are shown only two diffracted light beams 31, 32, respectively diffracted at the wavelength λ1 and λ2.

For reasons of overall size, the diffracted light beams 31, 32 are then folded over by reflection on the third concave mirror 502A and on the first planar mirror 503A.

At the exit of the first dispersive stage 500A and upstream of the second dispersive stage 500B, a filtering slit 501 is placed on the optical path of the diffracted light beams 31, 32.

This filtering slit 501 has for function to spatially filter the diffracted light beams 31, 32 and to reduce the spurious light propagating in the monochromator.

More generally, the filtering slit 501 may comprise a mask having a plurality of apertures allowing to select simultaneously several well-defined spectrum bands as a function of the aperture sizes and their respective spacing.

As a variant, the filtering slit could comprise another type of mask having a plurality of apertures allowing to perform a function of eventually complex spectral filter.

Similarly to the first dispersive stage 500A, the second dispersive stage 500B includes:
  a second planar mirror 503B,
  a fourth concave mirror 502B, identical to the third concave mirror, and
  a second polarization-separation diffraction grating 531B, identical to the first one and also operating in transmission.

The second planar mirror 503B reflects the diffracted light beams 31, 32 filtered by the filtering slit 501 towards the fourth concave mirror 502B, the latter folding over the diffracted light beams 31, 32 to direct them towards the second polarization-separation diffraction grating 531B.

The second polarization-separation diffraction grating 531B then diffracts a second time the diffracted light beams 31, 32.

As mentioned hereinabove, according to this first embodiment of a monochromator, the two dispersive stages 500A, 500B are herein in a subtractive configuration.

This means that the monochromator 500 is configured in such a manner that the second dispersive stage 500B compensate for the dispersion of the first dispersive stage 500A.

In particular, herein, the second polarization-separation diffraction grating 531B is oriented in such a manner that the diffracted light beams 31, 32, incident on this second polarization-separation diffraction grating 531B are superimposed to each other after diffraction in reflection on the second polarization-separation diffraction grating 531B and form an emergent light beam 20A that is a collimated beam.

For that purpose, the orientation of the second polarization-separation diffraction grating 531B is herein obtained by rotation of 180° of the first polarization-separation diffraction grating 531A about the optical axis A1 of the polarization-modification means 1100.

Hence, the light beam coming from the second dispersive stage 550A may then be focussed by the focussing means 540 on the image plane 505.

Variant of the First Embodiment of a Monochromator

In FIG. 10 is shown a variant of the first monochromator 500 including two successive dispersive stages 500A, 500B, that are herein cascaded in an additive configuration.

This variant includes the same elements as the monochromator 500 of FIG. 9.

On the other hand, the configuration of the variant of the first monochromator 500 is such that the orientation of the first polarization-separation diffraction grating 531A is identical to that of the second polarization-separation diffraction grating 531B.

In such conditions, the second polarization-separation diffraction grating 531B does not compensate anymore for the diffraction by the first polarization-separation diffraction grating 531A but, on the contrary, doubles the dispersion of the diffracted light beams 31, 32 so that they are separated at the exit of the second dispersive stage 500B.

The second concave mirror 540 then focusses the diffracted light beams 31, 32 to two distinct focussing points of the image plane 505.

Second Embodiment of a Monochromator

In FIG. 11 is shown a second embodiment of a monochromator 600 including three successive dispersive stages:
  a first dispersive stage 600A and a second dispersive stage 600B cascaded in a subtractive configuration, and
  a simple third dispersive stage 600C.

In this second embodiment, the different elements located upstream or downstream of the different dispersive stages are identical to the elements of the first embodiment of a monochromator 500 shown in FIG. 9.

Similarly, the first dispersive stage 600A is identical to the first dispersive stage 500A of the first embodiment of a monochromator.

The second dispersive stage 600B includes not only all the elements of the second dispersive stage 500B of the first embodiment of the monochromator 500, but also a fifth concave mirror 602C and a fourth planar mirror 603C.

The first dispersive stage 600A and the second dispersive stage 600B being cascaded in a subtractive configuration, the beam obtained by diffraction on the second polarization-separation diffraction grating 531B is the collimated emergent light beam 20A.

As in the first dispersive stage 600A, this collimated emergent light beam 20A is folded over by the fifth concave mirror then reflected by the third planar mirror 603C.

It then passes through a second filtering slit 601 located along the optical path, between the second dispersive stage 600B and the third dispersive stage 600C.

The third dispersive stage 600C is a conventional dispersive stage that herein comprises a fifth planar mirror 603D, a sixth concave mirror 602D and a line diffraction grating 631C that may have a very high dispersive power.

As a variant, the third dispersive stage could for example include a polarization-separation diffraction grating, which would then be identical to the first diffraction grating.

The interest of a monochromator as that shown in FIG. 11 is to propose a monochromator that disperse in the image plane 505 a small spectrum band with the same dispersion as in the plane of the filtering slit 501 (if the focal points of the stages are the same), but with a far lower rate of spurious light, due to the double filtering in the plane of the filtering slit 501 and in the plane of the second filtering slit 601.

Variant of the Second Embodiment of a Monochromator

In FIG. 12 is shown a variant of the second monochromator 600 including:
  two successive dispersive stages 600A, 600B that are herein cascaded in additive configuration, and
  a third dispersive stage 600C identical to that of the monochromator 600 shown in FIG. 11.

The interest of a monochromator according to the variant shown in FIG. 12 is to propose a monochromator that adds the dispersions of the three stages, and allows to reach great dispersions with a very low rate of spurious light, far more lower than that which would be obtained using a single stage that is three times more dispersive.

The invention claimed is:

1. A spectrometer for analysing the spectrum of an upstream light beam comprising:
  an entrance slit adapted to let the upstream light beam through;
  angular dispersion means, adapted to angularly disperse a rectified light beam as a function of a plurality of wavelengths into a plurality of diffracted light beams, wherein said angular dispersion means comprise at least one polarization-separation diffraction grating that is adapted, when said rectified light beam has a predetermined rectified polarization state that is circular, to diffract, for said plurality of wavelengths, said rectified light beam into the plurality of diffracted light beams in a same particular diffraction order, which is either the diffraction order +1 or the diffraction order −1; and
  polarization-modification means arranged between said entrance slit and said angular dispersion means, and adapted, for said plurality of wavelengths, to modify the polarization state of said upstream light beam to generate said rectified light beam according to the predetermined rectified polarization state, said polarization-modification means comprising:
    polarization-separation means adapted, for said plurality of wavelengths, to generate, from said upstream light beam, a first separated light beam and a second separated light beam that have polarization states that are orthogonal to each other, and
    polarization-rectification means adapted, for said plurality of wavelengths, to generate a first rectified polarized light beam from said first separated light beam and a second rectified polarized light beam from said second separated light beam, said first rectified polarized light beam and said second rectified polarized light beam having a same polarization state that is circular, said first rectified polarized light beam and said second rectified polarized light beam forming said rectified light beam having said same circular polarization state.

2. The spectrometer according to claim 1, including detection means adapted to measure the light intensity of said plurality of diffracted light beams for each wavelength of the said plurality of wavelengths, and to deliver a signal representative of said spectrum of the upstream light beam.

3. The spectrometer according to claim 2, wherein said detection means comprise a multi-channel detector.

4. The spectrometer according to claim 2, wherein said detection means comprise a slit and a single-channel detector.

5. The spectrometer according to claim 2, further comprising focussing means of said plurality of diffracted light beams angularly diffracted according to said plurality of wavelengths, said focussing means being adapted to focus, for each wavelength of said plurality of wavelengths, said plurality of diffracted light beams on an image plane or on said detection means.

6. The spectrometer according to claim 1, including focussing means of said plurality of diffracted light beams angularly diffracted according to said plurality of wavelengths, said focussing means being adapted to focus, for each wavelength of said plurality of wavelengths, said plurality of diffracted light beams on an image plane or on said detection means.

7. The spectrometer according to claim 1, wherein said polarization-rectification means comprise:
  a first optical polarization-rectifier component adapted, for said plurality of wavelengths, to generate said first rectified polarized light beam from said first separated light beam at said plurality of wavelengths, and
  a second optical polarization-rectifier component adapted, for the plurality of wavelengths, to generate said second rectified polarized light beam from said second separated light beam at said plurality of wavelengths.

8. The spectrometer according to claim 1, wherein said polarization-separation means comprise:
  a first optical system adapted to intercept at the entrance said upstream light beam to direct it at the exit towards at least one optical polarization-separator component that is adapted, for said plurality of wavelengths, to generate, from said upstream light beam, said first separated light beam and said second separated light beam.

9. The spectrometer according to claim 8, wherein:
  said first optical system is arranged so that the light rays of said upstream light beam are all parallel to each other at the exit of said first optical system, and in which said polarization-separation means also comprise a second optical system adapted, for said plurality of wavelengths, to intercept at the entrance, on the one hand, said first separated light beam to focus it on said first optical polarization-rectifier component and, on the other hand, said second separated light beam to focus it on said second optical polarization-rectifier component.

10. The spectrometer according to claim 9, wherein:
said optical polarization-separator component comprises a Wollaston prism, a Rochon prism, a Sénarmont prism, or a beam-displacer prism, configured so that said first separated light beam and said second separated light beam have linear polarization states that are orthogonal to each other, and
said first optical polarization-rectifier component comprises a first quarter-wave retardation plate having a first slow axis and said second optical polarization-rectifier component comprises a second quarter-wave retardation plate having a second slow axis perpendicular to said first slow axis.

11. The spectrometer according to claim 9, wherein:
said optical polarization-separator component comprises another polarization-separation diffraction grating adapted, for said plurality of wavelengths, to diffract said upstream light beam into:
said first separated light beam that is diffracted in a first diffraction order, which is either the diffraction order +1 or the diffraction order −1, and which has a first circular polarization state, and into
said second separated light beam that is diffracted in a second diffraction order, which is either the diffraction order +1 if said first diffraction order is the diffraction order −1 or the diffraction order −1 if said first diffraction order is the diffraction order +1, and which has a second circular polarization state orthogonal to said first circular polarization state, and
wherein said first optical polarization-rectifier component comprises a half-wave retardation plate arranged so at to reverse the polarization state of said first separated light beam, and said second optical polarization-rectifier component comprises a parallel-face neutral plate adapted to keep the polarization state of said second separated light beam.

12. The spectrometer according to claim 8, wherein:
said optical polarization-separator component comprises a Wollaston prism, a Rochon prism, a Sénarmont prism, or a beam-displacer prism, configured so that said first separated light beam and said second separated light beam have linear polarization states that are orthogonal to each other, and
said first optical polarization-rectifier component comprises a first quarter-wave retardation plate having a first slow axis and said second optical polarization-rectifier component comprises a second quarter-wave retardation plate having a second slow axis perpendicular to said first slow axis.

13. The spectrometer according to claim 8, wherein:
said optical polarization-separator component comprises another polarization-separation diffraction grating adapted, for said plurality of wavelengths, to diffract said upstream light beam into:
said first separated light beam that is diffracted in a first diffraction order, which is either the diffraction order +1 or the diffraction order −1, and which has a first circular polarization state, and into
said second separated light beam that is diffracted in a second diffraction order, which is either the diffraction order +1 if said first diffraction order is the diffraction order −1 or the diffraction order −1 if said first diffraction order is the diffraction order +1, and which has a second circular polarization state orthogonal to said first circular polarization state, and
wherein said first optical polarization-rectifier component comprises a half-wave retardation plate arranged so at to reverse the polarization state of said first separated light beam, and said second optical polarization-rectifier component comprises a parallel-face neutral plate adapted to keep the polarization state of said second separated light beam.

14. The spectrometer according to claim 1, further comprising a plurality of dispersive stages receiving said rectified light beam from the polarization modification means, said dispersive stages being cascaded in additive or subtractive configuration.

15. The spectrometer according to claim 1, wherein said angular dispersion means comprise a prism having an entrance face that intercepts said rectified light beam and an exit face on which said polarization-separation diffraction grating is arranged.

* * * * *